United States Patent [19]
Dimitrios et al.

[11] Patent Number: 5,659,723
[45] Date of Patent: Aug. 19, 1997

[54] ENTITY/RELATIONSHIP TO OBJECT ORIENTED LOGICAL MODEL CONVERSION METHOD

[75] Inventors: Peter Paul Dimitrios; Frank Sydnor Haynes, both of Cary; Anthony Hayden Lindsey, Raleigh; Mark Edward Lorenz, Cary, all of N.C.

[73] Assignee: International Business Machines Corporation, Armonk, N.Y.

[21] Appl. No.: 810,984

[22] Filed: Dec. 20, 1991

[51] Int. Cl.$^6$ .............................. G06F 15/00; G06F 12/08
[52] U.S. Cl. .................... 395/614; 395/500; 364/578; 364/192; 364/DIG. 1; 364/280.4; 364/283.2; 364/283.4
[58] Field of Search ................................ 364/192, 578, 364/DIG. 1; 395/600, 800, 500, 700

[56] References Cited

U.S. PATENT DOCUMENTS

| | | | |
|---|---|---|---|
| 5,019,961 | 5/1991 | Addesso | 364/192 |
| 5,295,256 | 3/1994 | Bapat | 395/500 |
| 5,313,633 | 5/1994 | Tomita | 395/700 |

OTHER PUBLICATIONS

Lee et al, "The Construction of an Object Oriented Specification Model", 1990, pp. 384–389 IEEE.

Lazimy, "A Deductive Approach for Problem Representation and Modeling Support: Conceptual Schema and Object-Oriented Models", Jan. 1991, pp. 291–305. IEEE.

Mazumdar et al, "Modeling the Environment and Interface for Real-Time Monitoring and Control", Jun. 1991, pp. 1598–1603.

Ravalet, "Transformation D'UN Schema Entite-Association en Base de Donnees Orientees Objets" Dec. 3, 1990, pp. 289–303.

Entity-Relationship Approach to Information Modeling and Analysis pp. 360–379 Oct. 12–14, 81.

*Primary Examiner*—Thomas G. Black
*Assistant Examiner*—Jean R. Homere
*Attorney, Agent, or Firm*—Edward H. Duffield

[57] ABSTRACT

A method for automatically translating computer application program modeling data expressed in entity/relationship terminology into computer application program model data expressed in object oriented terminology. A conversion process extracts unique entity names from the E/R model database and converts the entity names so found into object oriented class names. Next, based on the type of entity/relationships found in the E/R data model, target and source entities are identified for each "is a" type of relationship and the converted object oriented class names are arranged in a hierarchical inheritance grouping in which each unique class name whose matching entity name is the source of a "is a" relationship is subordinate to the unique object class name in the hierarchy which matches the target entity name is said "is a" relationship and in which grouping any unique object class name that has no matching entity with an "is a" relationship is placed subordinate to an arbitrarily selected unique object class name.

16 Claims, 9 Drawing Sheets

ENTITY/RELATIONSHIP TO OBJECT ORIENTED LOGICAL MODEL CONVERSION METHOD

FIELD OF THE INVENTION

This invention relates to computer program application design modeling systems and methods in general and particularly to logical modeling methods of the object oriented sort in which existing entity/relationship logical models are to be translated or converted to object oriented standards.

PRIOR ART

Object oriented computer application modeling methods are fairly well known and have been the source of much recent publication due to the emergence of object oriented software systems. The seminal work in this area by Adele Goldberg and David Robson is of course well known. Their book entitled "Smalltalk-80, the Language and its Implementation" is published by Addison Wesley, copyright 1983. However, the basic concepts of object oriented programming technology finds its roots in the SIMULA programming language developed in Norway during the 1960's in work done by Dahl and Nygaard. An overview of the history, terminology and basic concepts of object oriented technology may be found in "Object Oriented Technology: A Manager's Guide" by David A. Taylor, copyright 1990, Servio Corporation.

Despite the current popularity and growing prevalence of object oriented computer application program design tools and methods, nevertheless there exists a large body of computer application design data amassed over years of utilizing the widely employed entity/relationship logical modeling terminology, concepts and tools. For example, computer modeling has been applied to many areas of endeavor and modeling tools for actually creating computer application programs for the system or problem being modeled exist. One such modeling tool for producing graphical models for the typical entity relationship logical modeling structure may be seen in U.S. Pat. No. 5,019,961, for example. The logical modeling contemplated by such tools is concerned with describing the entities and their relationships to other entities. Entities are each composed of a group of attributes and values for attributes; entities may engage in various relationships with other entities, each having its own attribute values. The relationship itself may also have attribute values. A resulting entity relationship model of an application for a computer program is typically modeled by such a tool to present the user with a diagrammatic logical model display that consists of entities, their relationships and roles and the various attributes of the entities.

A brief review of the foregoing U.S. Pat. No. 5,019,961 can serve well to identify and introduce the terminology of the entity relationship modeling technique. Models of this type, whether produced by the automated system and tool in the aforementioned patent or by manual labor, have long been known in the data processing industry, particularly in that portion thereof devoted to the production of user application software for which each user business situation or scenario is usually modeled prior to designing and constructing the application software. These models represent a significant investment of time and effort and human analysis but they are not easily amenable to reuse in the object oriented approaches to computer process logical modeling and its terminology today.

OBJECTS OF THE INVENTION

In view of the foregoing known shortcomings with the entity relationship modeling systems, it is an object of this invention to provide an improved modeling system capable of converting entity relationship logical models into object oriented logical models.

Yet another object of this invention is to provide an improved process and method by which existing E/R models of computer program applications may be automatically converted into object oriented (O-O) models and terminology to assist in developing object oriented applications programs.

BRIEF SUMMARY OF THE INVENTION

The foregoing and still other objects not specifically enumerated are met in the present invention by providing access in a computer system to a database containing E/R models of application programs or business situations. The E/R data is then handled by operative program methods running in the computer system to automatically convert the E/R data input into object oriented and hierarchically arranged object classes, instances and properties such as inheritance in an O-O logical modeling format and terminology. A computer process for automatically converting the E/R modeling data into O-O modeling data and terminology examines the E/R database for the modeling data it contains, extracting each unique entity name from the modeling data and creating object class names for each identified unique entity name. Next the conversion process determines for each unique object oriented class name whether the entity of the same name has a target entity to source entity relationship of the "is a" type. Finally, the process arranges the converted O-O class names into a hierarchical inheritance grouping or listing of data in which each unique object class name whose matching entity name happens to be the source of an "is a" relationship is placed in a hierarchy subordinate to the unique object class name which matches the target entity name in the "is a" relationship and in which each unique object class having no matching entity name with an "is a" relationship is placed subordinate to an arbitrarily selected unique object class name such as "Object".

BRIEF DESCRIPTION OF DRAWINGS

A preferred embodiment of the invention together with step by step description of the process for the automatic translation or conversion of E/R modeling data to O-O modeling data will be made with reference to a drawing of a preferred embodiment in which.

DETAILED DESCRIPTION OF PREFERRED EMBODIMENT OF INVENTION

Figure 1:
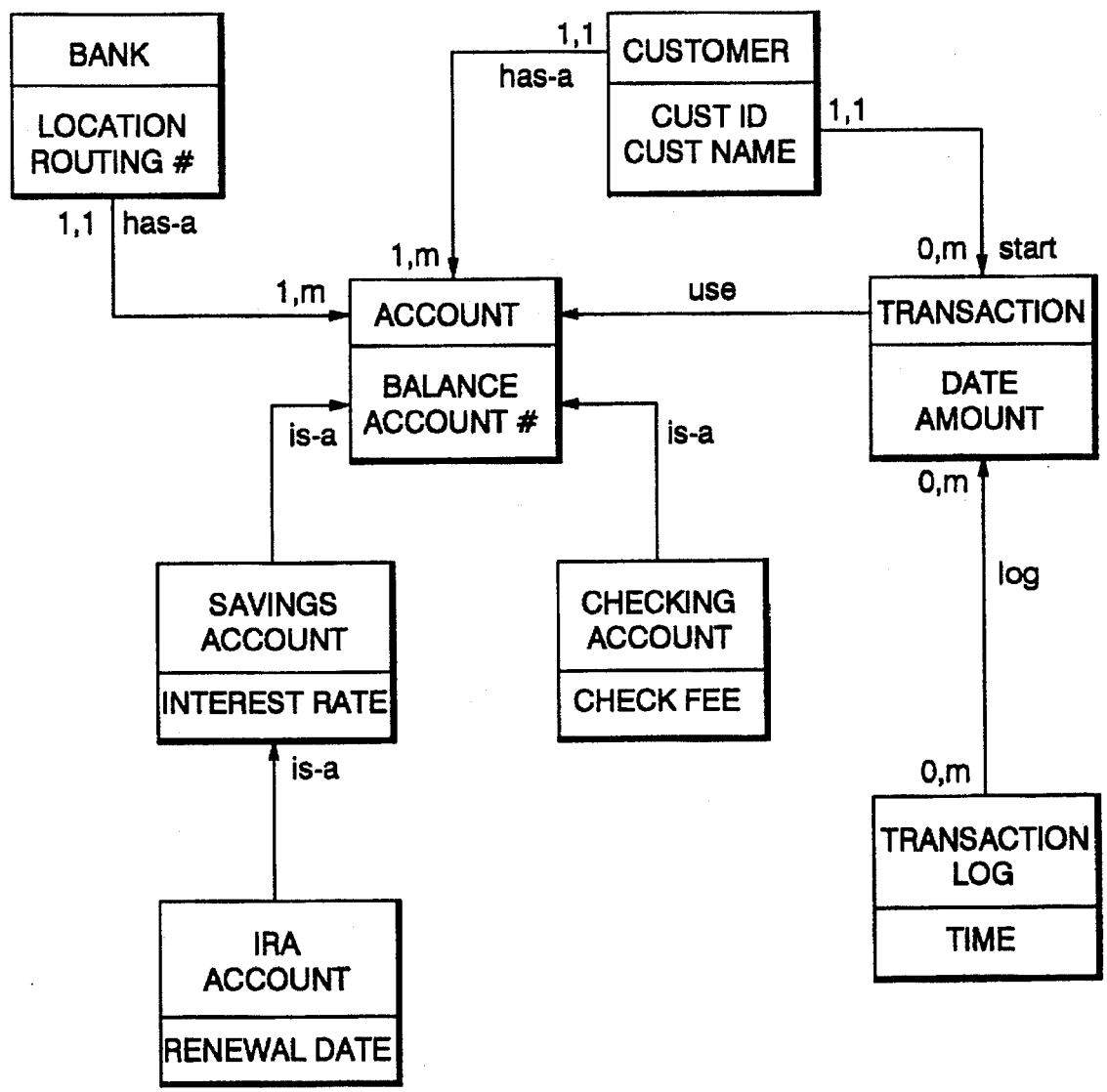
FIG. 1 illustrates a typical E/R prior art data model such as that which might result from one of the various E/R modeling tools.

A full description of a preferred embodiment of a computer process or program utilizable in the computer system for automatically converting E/R modeling data into O-O terminology will follow, but a brief introduction to the terminology employed will be given first.

Industry wide acceptance of the entity/relationship modeling approach has long been in existence. Numerous publications might be cited but the work entitled Modern Structured Analysis by Edward Yourdon, Yourdon Press, copyright 1989 and "Structured Analysis and Systems Specification" by DeMarco, Prentiss Hall, copyright 1979 is another good reference. The entity/relationship terms utilized in this invention are: "entity" meaning a description of a business object or concept such as "account" or "customer". An entity has a name and properties or attributes; "relationship" meaning a description of some interaction between two entities in a business; "relationship source" meaning one of two entities involved in a relationship. The source is the starting point of the relationship; "relationship target" meaning one of two entities involved in a relationship. The target is at the ending point of the relationship; and "attribute" meaning data associated with an entity or relationship.

In the object oriented programming technique, new terminology and concepts are encountered. While these are widely known within the industry, one useful source for defining these terms is "Object Oriented Programming: an Evolutionary Approach" by Cox, copyright 1986, revised 1987, Addison-Wesley Publishing Company and includes general definitions consistent with their usage for the following object oriented (O-O) terms:

Object: a software packet containing a collection of related data or information in the form of variables and methods or procedures for operating on the data it contains. "Objects" model things in the physical world. The things modeled may be physical entities such as cars, events such as a concert or performance or chemical or mechanical process or abstractions such as a general purpose bank account. The "object" will have data representing its state and its behavior and its methods or functions which it performs.

Instance: an example of an actual object in a given state, waiting to perform services and holding some state data. For example, a person's account in a bank is an object "instance" of the class of objects called "account".

Instance Variable: a place holder for storing object state data for a given instance of the object.

Class: a name template that defines the structure and capabilities of an object instance. The definition of the class includes the state data and the behaviors or methods for the various instances of that class. An "account" class of objects may have methods to allow deposits and withdrawals to be made, may use a balance instance variable to hold a current balance or contain variable data representing something about the object being modeled.

Superclass: An object class at a higher level of abstraction that is more generalized and less specialized than some subsidiary class contained within it.

Subclass: A more specialized class of objects than its superclass and related to the superclass by a relationship of a given type such as an "is a" relationship. For example, a car is a subclass of the general superclass vehicle.

Hierarchy: laterally, this is a tree or inheritance structure which ranks the classes, superclasses and subclasses so that organizations of objects having the same services, data, etc. may be built. Typically lower level subclasses use services of all of the higher classes in their hierarchy and are therefore said to "inherit" these capabilities.

Inheritance: a way of stating the capability that one may have for reusing services and data. Savings accounts are types of a general class called "account", but IRA accounts are types of savings accounts. The savings account and IRA account inherit the capability to handle deposits from the superclass object named "account".

Other uses of these and similar terms will become clearer as this detailed description progresses through consideration of an actual example.

As noted briefly above, traditional software application development and design approaches require a human or manual translation from the business model of a given situation to a computer application implementation that reflects the business situation. A paradigm shift from real world concepts in a given business situation described in a business model to the procedures or methods to be performed on or with data in a traditional, function based computer program design is the result of this manual design process. Numerous such processes exist but one widely used one is the so-called entity/relationship design method. In fact, a great number of real world business situations have been modeled in the E/R design terminology and exist in the form of design application data. This data in the form of the design models for a variety of different business situations represents a valuable resource, but one which is not easily amenable to the modeling techniques of object oriented software development which is currently supplanting other design methods. The present invention provides a means for making automatic translation from program data models expressed in E/R design terms and representations into O-O computer programming terms and hierarchies. The conversion process that will be described takes advantage of the similarities in the paradigms between the E/R design methodology and O-O terminologies and methods. Automation of the conversion from E/R programming design model representations to O-O programming design model representations allows a less error prone approach than the traditional conversion which is a manual or a mental human process prone to error.

Given a well-formulated E/R design, it will be shown that it is possible to automate the conversion to object oriented design based on the same E/R design data. Consistent naming of entities, attributes and relationships by the E/R designer is one requirement in any well-formulated E/R design. The E/R designer in formulating an E/R design often pays particular attention when naming entities and their attributes so that different names are not utilized to describe the same thing and like entities describe the same things. Consistent naming is presumed and is a requirement for a successful automated conversion to O-O. The E/R software application designer is typically free to name relationships among the various entities in the business situation in any arbitrary way. For example, a relationship may be described as "contains" or "has" or "holds" and all could represent the same type of relationship. Consistent naming of relationships is another requirement for optimum convertibility of E/R databases and their contents into O-O terminology.

As utilized in this document, the relationships are categorized in three forms:

The "has a" relationship. This relationship represents information contained by or owned by an entity. It corresponds to object data in an object oriented model or an instance variable for the object chosen to represent the entity and its relationship.

The "is a" relationship. This relationship represents how entities may be related by type to one another. It is used to place converted object oriented class names within an inheritance hierarchy for an O-O data model.

The "other" relationship. Any relationship which is not categorized as either a "is a" or "has a" relationship may represent how the entities of the business situation being modeled behave or may represent the functions being performed by the entity. In converting from E/R data model representations to O-O modeling terms, these relationships can represent the basic functions that will be performed by the objects.

Consistency of naming is not only desirable but is also the result of utilizing any of the well known commercially available E/R modeling tools. These tools, some of which are referred to above, assist the designer in creating E/R data models of any given business enterprise situation by an application program.

Certain rules also need to be adhered to such as the fact that "is a" relationships cannot be circular in which each of two entities defines itself as a target of another entity which is the source of the relationship. For example, a checking account is an account but an account is not necessarily a checking account. Also, the target entity and source entity in an "is a" relationship cannot be the same entity. These relatively obvious logical rules are also enforced generally by most E/R design tools available in the marketplace. A word on cardinality. E/R relationships have a property known as cardinality which specifies how many entity sources and how many entity targets a given relationship may have and also specifies whether the source or the target entities are required in order for the relationship to exist.

With this preparatory material understood, a preferred embodiment of an automatic process for converting E/R modeling data to O-O modeling data and terminology will be given in a form which describes a computer program embodiment of the overall conversion process and its various steps required to provide a full conversion of inputted E/R modeling data. The E/R model data is resident in a database as shown in the aforementioned U.S. Pat. No. 5,019,961. A computer processor having access to the database and running the computer program to be described herein can produce the conformed or translated object oriented terminology. Table 1 below summarizes the results of E/R to O-O conversion steps and shows how various things in an E/R design relate to similar things in an object oriented design in a conceptual way.

TABLE 1

Correspondence Between E/R and O-O Model Concepts

| E/R Model | O-O Model |
| --- | --- |
| Entity | Class |
| Attribute | Object data (instance variable) |
| Relationship | Object data, inheritance hierarchy, or method |

Turning to FIG. 1, a pictorial schematic is given to illustrate a simple E/R application program model whose data would be captured and stored in a database for analysis and conversion into an O/O model design dataset. In FIG. 1, entities of the E/R design model are represented by boxes in the diagram. The name of each entity together with any necessary entity attributes are shown in each box. Relationships between the entities are represented by the connecting lines and the degree of cardinality implicit in the relationships is shown at the source and target entity for each relationship and is represented by the minimum and maximum cardinalities separated by a comma. For example, for the entity entitled "Bank" a "has a" relationship exists with the entity named "account". The cardinality is such in this "has a" relationship that one bank may have many accounts (designated by the "1, m" adjacent the relationship line between "bank" and "account" near the name "account"). Conversely, that same account can have only one bank and there is a one for one cardinality or correlation between account and bank and shown by the "1,1" designation where the "has a" relationship line between "bank" and "account" joins the box named "bank". Other relationships such as "is a" relationships and "other" relationships (such as "use", "log", "start"), are also present in FIG. 1.

As such, FIG. 1 shows a typical E/R software application design schematic which the application programmer would utilize as a starting point for writing the modules of code necessary to model a banking application program that permits all of the operations implicit in the nature of the entities represented by bank, account, customer, transaction, checking account, savings account, IRA account and transaction log.

Returning to Table 1, it may be seen that "entities" correspond in the object oriented modeling terminology to "class" and that "attributes" correspond to "object data" (such as an instance variable) and that a "relationship" corresponds to either object data, an inheritance hierarchy or some process or method.

The example of FIG. 1 may be fully converted to an object oriented design structure as shown by Table 2 below. Table 2. A simple O-O design hierarchy. The classes in the design are listed. Indentation is used to illustrate the class hierarchy, with classes inheriting from the classes under which they are indented. In this example, Object is the class from which all classes of the design inherit. Object data (instance variables) are shown to the right. Object methods (behavior or procedures) are also shown to the right. This information corresponds to the information in an E/R model, as shown in FIG. 1. Table 3 gives detail behind the generated methods for these classes.

TABLE 2

A simple O—O design hierarchy. The classes in the design are listed. Indentation is used to illustrate the class hierarchy, with classes inheriting from the classes under which they are indented. In this example, Object is the class from which all classes of the design inherit. Object data (instance variables) are shown to the right. Object methods (behavior or procedures) are also shown to the right. This information corresponds to the information in an E/R model, as shown in FIG. 1. Table 3 gives detail behind the generated methods for these classes.

| Class Hierarchy (inheritance) | Object Data (instance variables) | Object Methods (behavior or procedures) |
| --- | --- | --- |
| Object | | |
| Bank | location, routing #, account | |
| Customer | cust id, cust name, account | start |
| Account | balance | |
| Checking | check fee | |
| Savings | interest rate | |
| IRA | renewal date | |
| Account | | |
| Transaction | date, amount | use |
| Transaction Log | time | log |

In Table 2, the object classes in the design are listed from top to bottom in the first column. Indentation is utilized to illustrate the class inheritance hierarchy in which classes inherit from classes which are superior to them as shown by the indentations. In the example given, "Object" is the class from which all classes of the design inherit some properties. Object data in the form of instance variables are shown in the next column and any implicit object's methods, behaviors or procedures are shown in the third column. The information corresponds to that present in the E/R model shown in FIG. 1, but it may be seen that it has been transformed into an entirely different terminology and representational format.

TABLE 3

Generated methods. As described, some high-level methods can be generated in the E/R to O—O conversion process based on the other relationships from the E/R information.

| Class | Method | Method Description |
| --- | --- | --- |
| Customer | start | Start a transaction. The method generated by the algorithm would be a method template, as described earlier. This template would be a placeholder for the actual code, added by the user, to start a transaction. |
| Transaction Log | log | Add a given transaction to the log of transactions. The method generated by the algorithm would be a method template, as described earlier. This template would be, a placeholder for the actual code, added by the user, to log a transaction. |
| Transaction | use | Use an account. The method generated by the algorithm would be a method template, as described earlier. This template would be a placeholder for the actual code, added by the user, to log a transaction |

Table 3 shows methods that can be implicitly derived in the E/R to O-O conversion process wherever an "other" relationship is encountered in the E/R information. The first column lists the class name, the second gives the name of the method relationship and the third column gives a brief description of the method that would be understood on the basis of the relationship.

A person faced with data in the form such as shown in FIG. 1 for E/R software application models of a given business scenario could convert it, by human application of the requisite naming and organizing steps to create the hierarchy such as shown in Table 2. However, this is laborious, time consuming and error prone and would be replicated enormously due to the large existing bases of application design information that has been built up through use of E/R design tools over the years by various application designers and programmers. Access to that information by a computer utilizing the automated process as will now be described can significantly reduce both the time and increase the accuracy by which the translations or conversions may be made.

Figure 2:
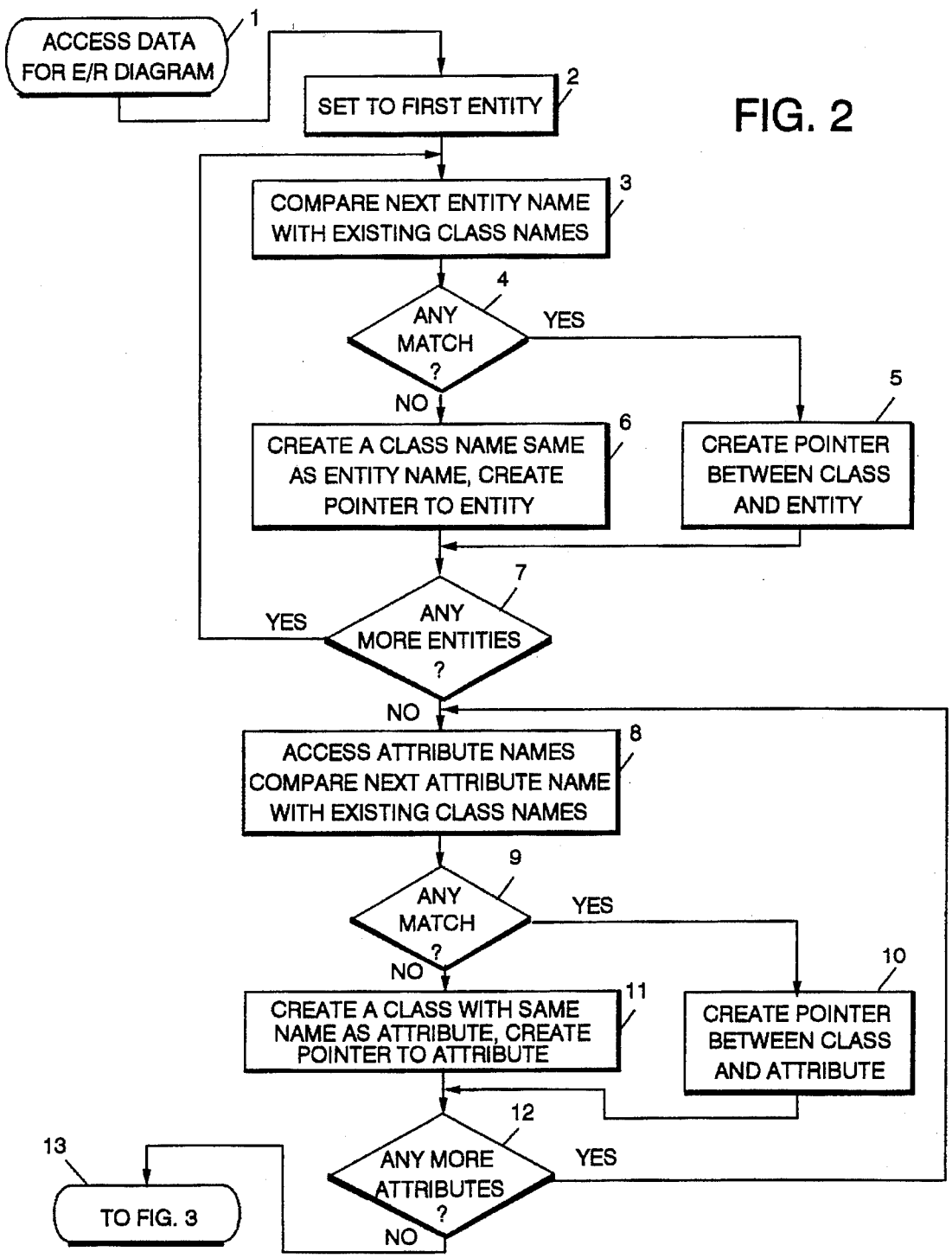
FIG. 2 through FIG. 9 illustrate in detail the flow chart of the conversion process necessary to convert the E/R modeling data into O-O terminology and hierarchy.
Figure 10:
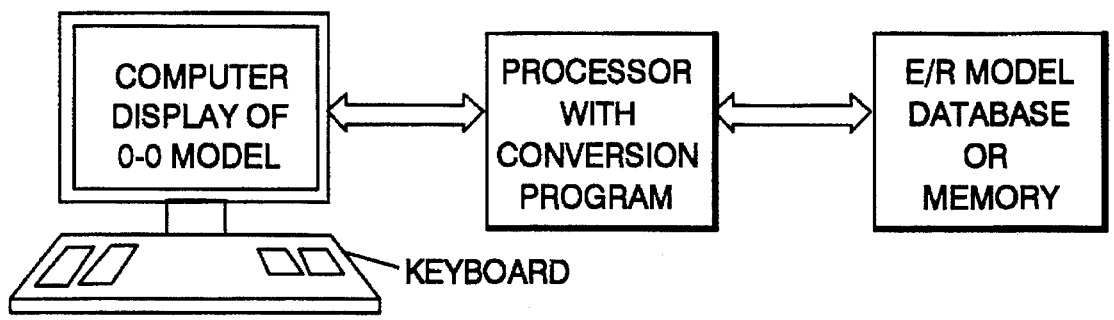
FIG. 10 illustrates the conversion system in which the method flow chart of FIGS. 2–9 may be utilized as software for analyzing E/R data which is to be converted into object oriented format and hierarchy.

Turning to FIG. 2, the process begins when a computer such as that shown in FIG. 10 accesses an E/R model database that has resulted from application of an E/R design tool or the like and it is desired to convert the E/R design model data to object oriented terminology and hierarchical organization.

Block 1 of FIG. 2 gives the initial step as accessing the data. The overall process is contained in the detailed process flow charts of FIGS. 2–9 and will be described in detail shortly. For an overall understanding, however, the following summary of the results of the process steps is given.

Given that an E/R application program design model for a given business situation has been created and exists in a database for use, an automatic E/R to O-O conversion process will be given. The results of this process were summarized in Tables 1–3 mentioned above. The first general step is to create object class names from the existing entity relationship data model. After accessing the E/R model data, the first step is to create object class names and object classes for all of the unique E/R entities encountered in the business application model in E/R format. An E/R diagram or data file may model an entire business enterprise or only a portion of it, but the data to be transformed or converted is first analyzed to extract any unique entity names. Then, as object class names are created in correspondence with entity names, it will be necessary to check to make certain that a name for a class has not already been utilized.

The next general step is to create instance variables for all attributes for each entity in the E/R data model. For each attribute of a given E/R entity, the process creates an object class corresponding to the attribute by name. These object classes are termed "instance variables" and their classes are based upon the attribute type which is encountered. The instance variables are recorded for the object classes corresponding to the named E/R entities.

A next step is to place the object classes into a hierarchical arrangement based upon their inheritance of properties or characteristics or methods. Once all of the object class names have been created in correspondence with the entity names encountered, the object class names must be placed in a class hierarchy based upon the corresponding E/R relationships which are defined in the E/R data being converted. This is done by defining the object superclasses based on "is a" relationships encountered in the E/R data model. The class object which corresponds to the source entity of the "is a" relationship becomes a subclass of objects and the class object corresponding to the target entity of the relationship becomes the superclass object. If an entity is not the source of any "is a" relationships, then its corresponding object class will be subclassed under a uniquely named arbitrary object top level class, for example "Object".

The next step is to add any remaining instance variables into the list. Object instance variables are indicated by the presence in the E/R data model of any entity attributes. Object instance variables may also be indicated by any "has a" entity relationships in the data model. Additional instance variables are created and named for each object class for each target entity in any "has a" entity relationships encountered in the E/R data model.

Finally, method templates are created for any "other" type of entity relationship targets. Templates represent high level entity functions based on the level of detail specified in the E/R design. They represent methods or behavior that items in the E/R model design exhibit or must have for their function. For example, an entity relationship named "start" exists in the examples given above. Start implies that a procedure for "starting" the target entity operation must be specified. It is modeled in the conversion process by inserting a marker named "start" in the output data wherever the E/R relationship of the "start" was encountered in the E/R database for the model.

Turning now to the derailed flowcharts in FIGS. 2–9, the input data of the E/R design model is searched to find all of the entity names. Each entity name is then checked against list of object classes, if any, for a match between the candidate entity name and the object class names. If a match is found, then an association in the form of a pointer is created between the existing object class name and the entity name. If no match is found, then a new object class name is created and added to the list. The new name objectclass has the same name as the entity. A pointer is created between this new object class and the entity.

In FIG. 2, accessing the data begins in block 1 and the data is searched to find the first entity in block 2. In block 3 the entity name first found is compared against any existing object class names. In block 4 the comparison for any match is made. If the answer is yes, the process continues to block 5 where a pointer (a software label or association indicating correspondence) is created between the object class name for which a match was found and the name of the entity. If no match is found in block 4, operation continues in block 6 with the creation of an object class name having the same name as the entity being compared. A pointer is created between this object class name and the entity. Block 7 simply checks for whether there are further entities in the E/R data model input data. If there are none, attribute names for the various entities are compared with the existing object class names in block 8.

Block 9 checks for whether a match between existing class names and any of the entity attribute names exists and if the answer is yes, block 10 creates another pointer between the object class of that name and the given attribute. If the answer is no, block 11 creates a new object class with the same name as the attribute and creates a pointer to that attribute. In block 12 the question is asked as to whether any more attributes exist and if so, the process loops back to the input of block 8; if not, operation continues at FIG. 3 as shown by the output in block 13 of FIG. 2.

Returning to FIG. 1, an example of this overall process is shown in which the entity named "bank" is converted into an object class called "bank" shown in Table 2. For attributes, "location" shown in FIG. 1 is an attribute that is converted to an object class "location" as shown in Table 2.

The next general step is to create instance variables for any entity's associated object class found from the process steps described above. For each unique entity name in the input data file of E/R model data, compare each attribute name in the entity's list of attributes with the list of instance variables in the entity's associated object class (i.e. the class to which the pointer indicates that the entity should correspond by name).

If a match is found between the given attribute name and the entity's list of attributes and the instance variables with the entity's associated object class, nothing further needs to be done. But if a match is not found, the name of the attribute is added to the entity's associated object class of instance variables. This creates a record in which the class represented by the entity attribute is an instance of the class name associated with the entity. For example, "location" is an attribute of "bank" in FIG. 1. It is added as an instance variable of the object class "bank" as shown in Table 2.

Figure 3:
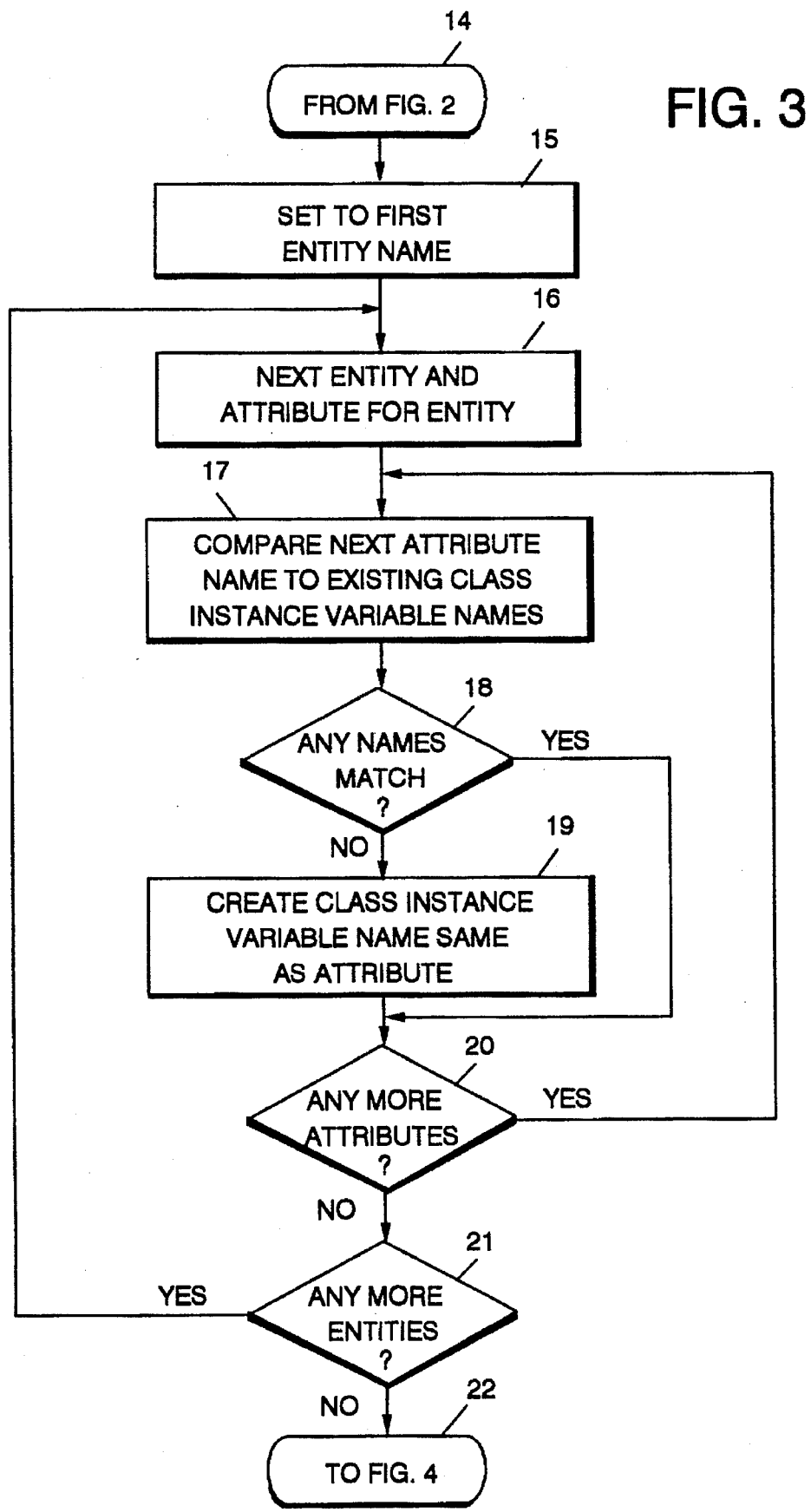
Figure 4:
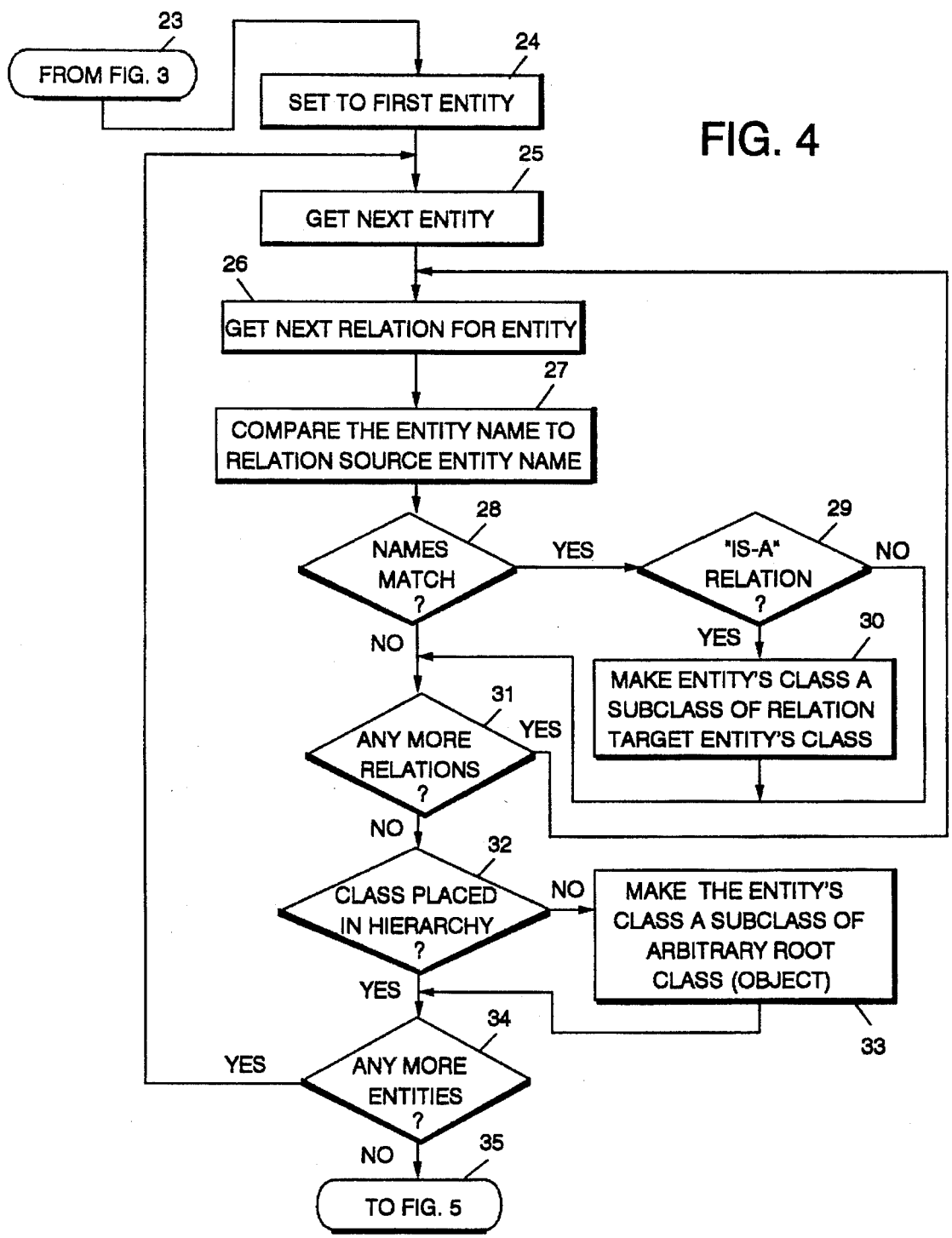

FIG. 3 illustrates this process beginning with block 14 which is entered from the output of FIG. 2. The entity names are reaccessed and the first entity name and any attributes for that entity are fetched in block 16. These are compared one at a time against the existing object class instance variable names in block 17. Block 18 is set to detect a match and if a match occurs, operation continues to block 20 where the question is asked whether more attributes exist and if so, operation loops back to the input of block 17 for fetching the next attribute name for comparison. However, if the result in the test of block 18 is no, an object class of instance variable having the same name as the attribute is created as shown in block 19. Block 20 checks for exhaustion of attributes for comparison and when no more attributes exist, a check is made for whether any further entities exist and if the answer is yes, operation loops back to the input of block 16 where the next entity and its associated attributes, if any, are fetched for comparison and the process continues in blocks 16–20 as before. If no further entities exist, the output moves to block 22 which begins the process as shown in FIG. 4 of placing the new object classes in the a hierarchical order.

In general, for each entity name in the input E/R model data, it is necessary to process the list of relationships and evaluate for the following conditions. If the entity name matches a source entity name in a relationship and if the relationship is of the "is a" type, then the object class associated with the given entity that is the target of the "is a" relationship becomes the superclass, i.e. the higher class of objects associated with the subordinate or subclass source entity object class. The superclass is recorded by storing the name of the object superclass with the object or, alternatively, by adding a pointer to the class' superclass. If the conditions given are not met, the class corresponding to the given entity will have a superclass given a name of a base, arbitrarily "selected", system wide dominant class, such as "Object".

In FIG. 1, for example, "bank" is an entity having no "is a" relationships. It therefore becomes a subclass of the general class "Object" as shown in Table 2. "Checking account", however, is an entity with an "is a" relationship which is related to the entity "account". The target entity "account" therefore becomes the superclass and checking account becomes a subclass of the superclass account as shown in Table 2.

For each attribute of each entity in the input list it is necessary to record the superclass of the associated object class for each attribute based upon the type of the attribute itself. Attribute types will typically correspond to predefined object classes such as a character, an alpha, numeric or so on. For example, an attribute "zip code" might have a further attribute of "character". The class of objects named zip code would thus be a subclass of the class of objects named "character". This process is shown in some detail beginning in FIG. 4 block 23. In block 24 the list of entities in the E/R dataset is again accessed and in blocks 25 and 26 the next entity and any associated relationships for that entity are gathered. In block 27 the entity name is compared to the relation source entity name and if they match, as shown in block 28, a determination must be made as to whether the relationship is an "is a" relation. This is done in block 29. If the relation is not an "is a" relation, flow continues to block 31 where any more relationships are checked. However, if the relationship is an "is a" relation in block 29, block 30 is entered which makes the entity's associated object class a subclass of the relationship target entity object class. When all relations have been exhausted in block 31, a check is made to see if the class has been placed into a hierarchy and if the answer is no, block 33 is entered which makes the entity object class a subclass of an arbitrarily named unique object class such as the root class Object. When all entities have been exhausted as shown in block 34 this part of the process is exited in block 35 which continues to FIG. 5.

Figure 5:
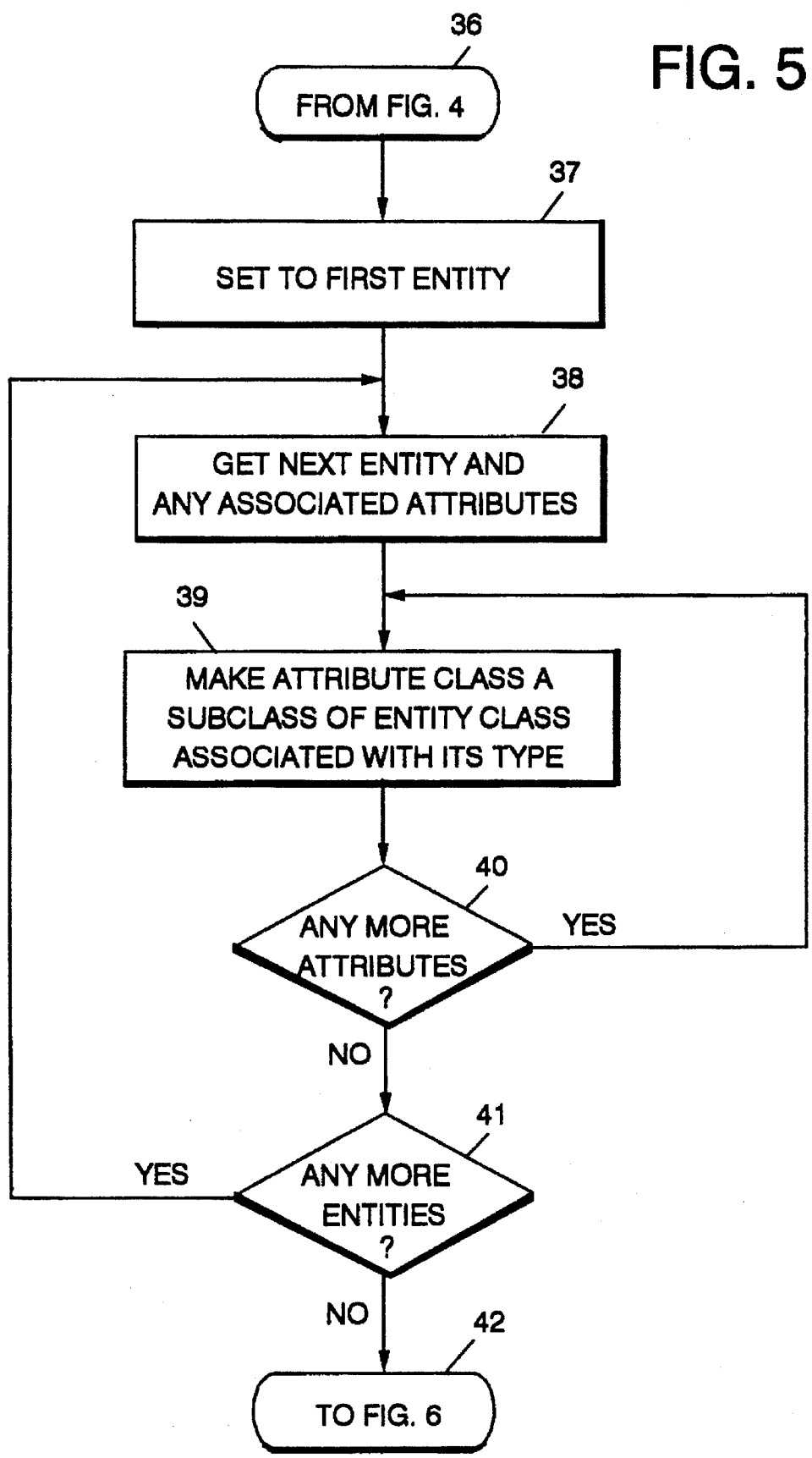

In FIG. 5, beginning at blocks 36 and 37, a list of entities is again accessed and any associated attributes are gathered as shown in block 38. In block 39 the attribute's object class will become a subclass of the entity object class associated with its type of attribute. In block 40, a check is made as to whether more attributes exist and if the answer is yes, operation loops back to the input of block 39 (assuming that the next entity and any associated attributes have been supplied from block 38) until all attributes are exhausted. When all attributes are exhausted, block 40 is exited to block 41 where the process loops back to check for any further entities and would proceed to check further associated attributes in blocks 38, 39, 40, etc. until all attributes for all entities have been properly classed and subclassed, where upon the process is exited in block 42 which enters FIG. 6.

In general, for each entity name in the input E/R design model data, the list of relationships must be evaluated and when an entity name matches the source entity name of a relationship and the relationship is a "has a" type, then the class of objects associated with the target entity becomes an instance variable associated with the source entity. That entity's name will be added to the list of object class instance variable names. At this point in the process all classes for entities involved will have already been created. In FIG. 1, for example, "customer" is an entity with a "has a" relationship to the entity "account". "Account" is the target entity in the "has a" relationship and account becomes an instance variable of the class of objects called "customer" in Table 2.

This process is detailed in FIG. 6 where again in blocks 43–45 the input E/R model data is accessed and the next entity name is taken out, together with any relationships in block 46 and a comparison is made between the entity name the relationship source entity name. This is in block 47. In block 48 if the names match, the question is directed to block 49 to check whether a "has a" relationship exists. If the answer is yes, then in block 50 the relationship target entity's object class becomes an instance variable of the entity's object class and flow continues to block 51 where any more relationships are checked. If the names do not match in block 48, block 51 is entered directly. When no more relationships exist, block 51 is exited and block 52 checks for the existence of any further entities and the process loops back to the input of block 45 and continues through block 51 until finally, no further entities are found in block 52, whereupon this portion of the process is exited at block 53.

The next step in the overall process is to create method templates or place holders for each entity name in the input list. It will be necessary to process the list of relationships in the input data and evaluate for the following conditions. If an entity name matches an entity which is the source of a relationship and the relationship is an "other" type of relationship, search the list of methods for the associated object class for the source entity to find if a match exists between the method name and the relationship name. If a match is found, create a pointer or association between the existing method and the relationship, but if a match is not found, add a method name place holder or marker having the name of the relationship into the object class' list of methods for the associated object class. Create an association between this newly named method and the relationship. If the conditions are not met, do nothing further.

For example, in FIG. 1 the "uses" relationship between the entity "transaction", which is the source entity, and "account", which is the target entity, may be fairly accurately representative of many different methods such as "withdraw", "deposit", "check balance", etc., but these would be given place markers or templates for later operations that would be described.

Figure 6:
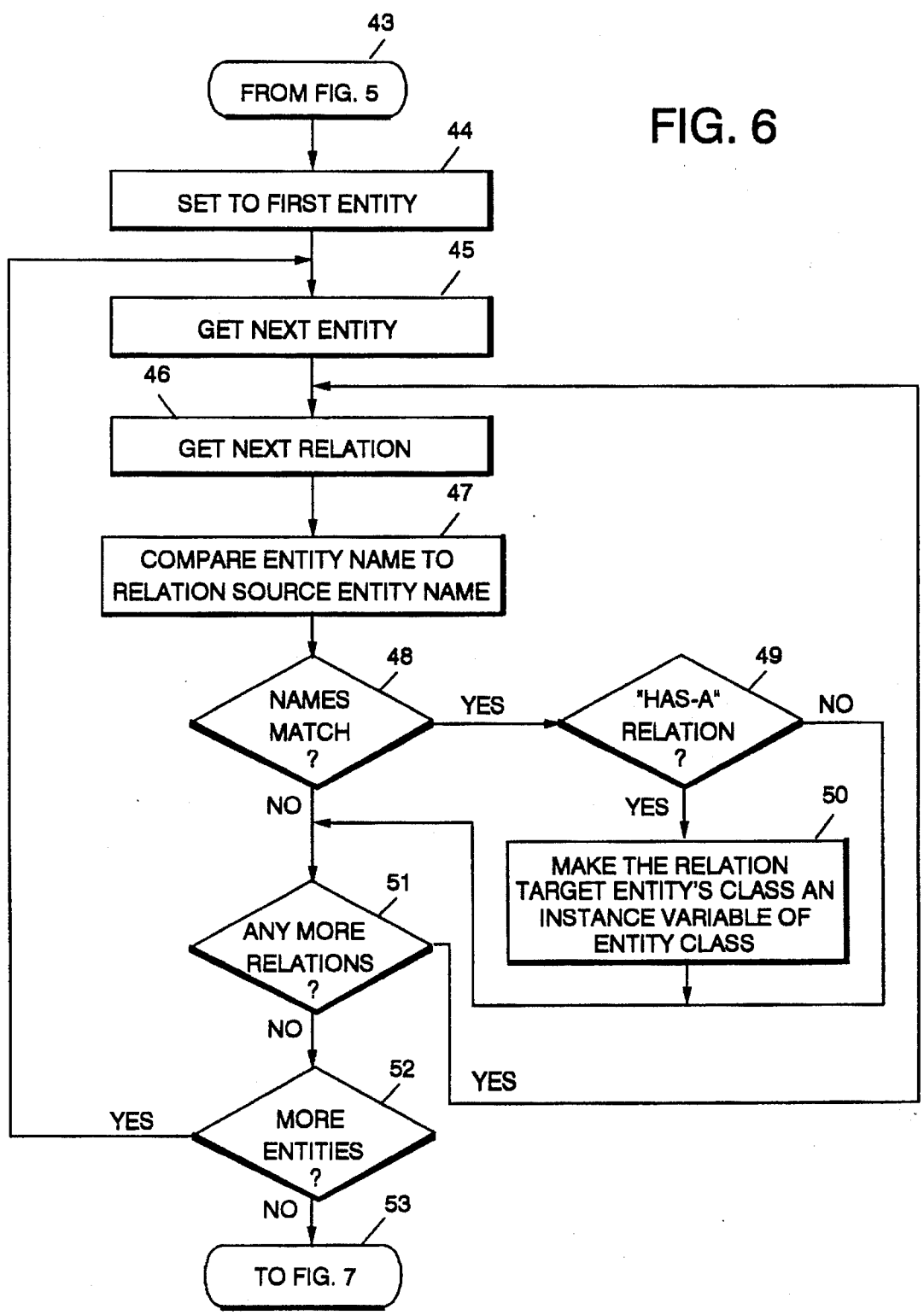
Figure 7:
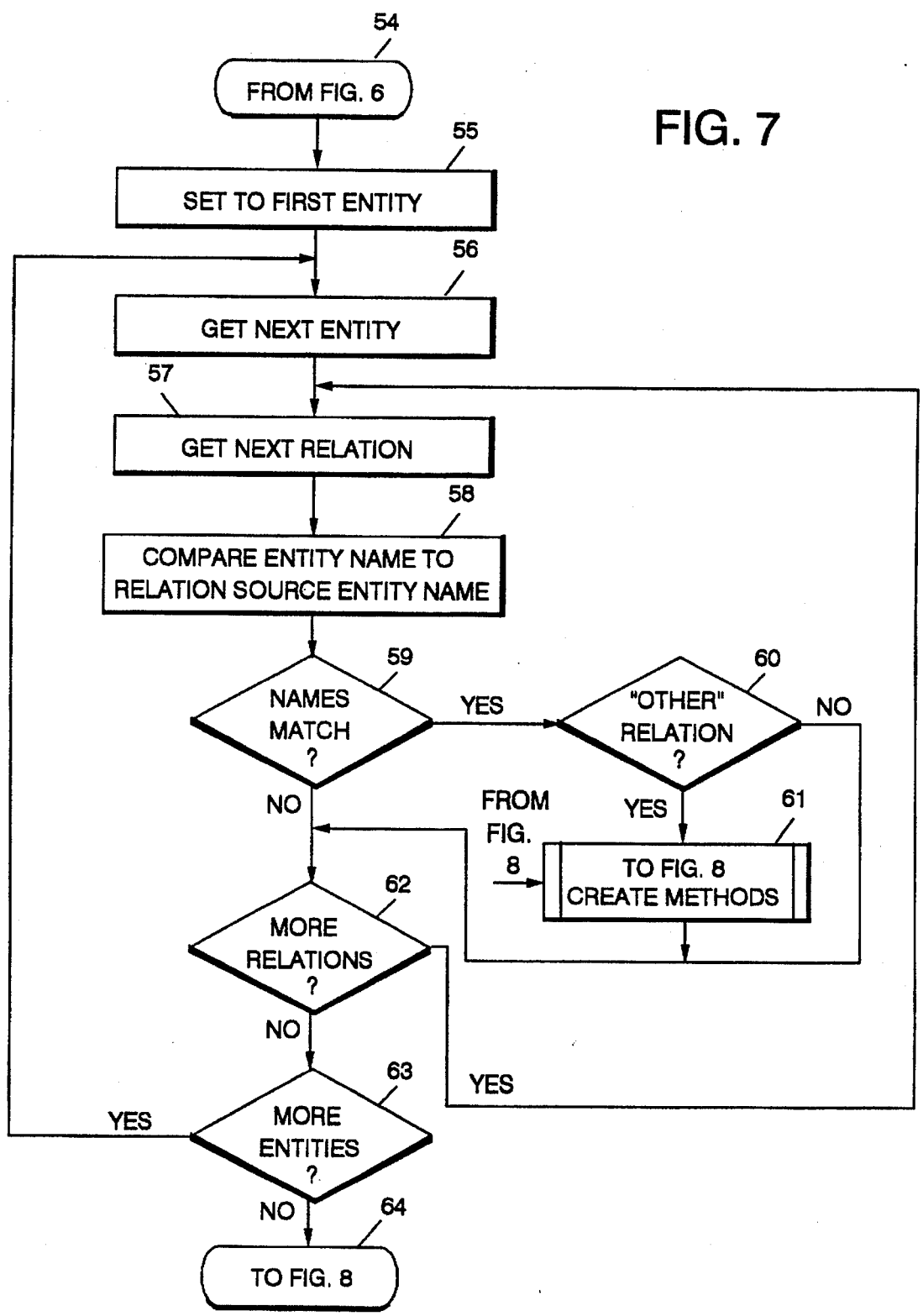

Turning to FIG. 7 the output from FIG. 6 is entered at the top of FIG. 7 in block 54. Again, the input E/R data is searched to extract the entity's names and relationships in blocks 55 through 57. In block 58, entity name and source entity in a relationship are compared and if a match exists as shown in block 59, a further check is made as to whether the relationship is an "other" type in block 60. If the answer is yes, operation continues to FIG. 8 where method names and relationships are generated, but if the names do not match in block 59 a check is made in block 62 as to whether any more relationships exist and if the answer is yes operation loops back to the input of block 57 as shown. If the answer is no, then a question is made as to whether any further entities exist and if yes, operation loops back to the input of block 56 as shown. When all relationships and their entities have been exhausted, block 63 is exited in block 64 which flows to the input in FIG. 9.

Figure 8:
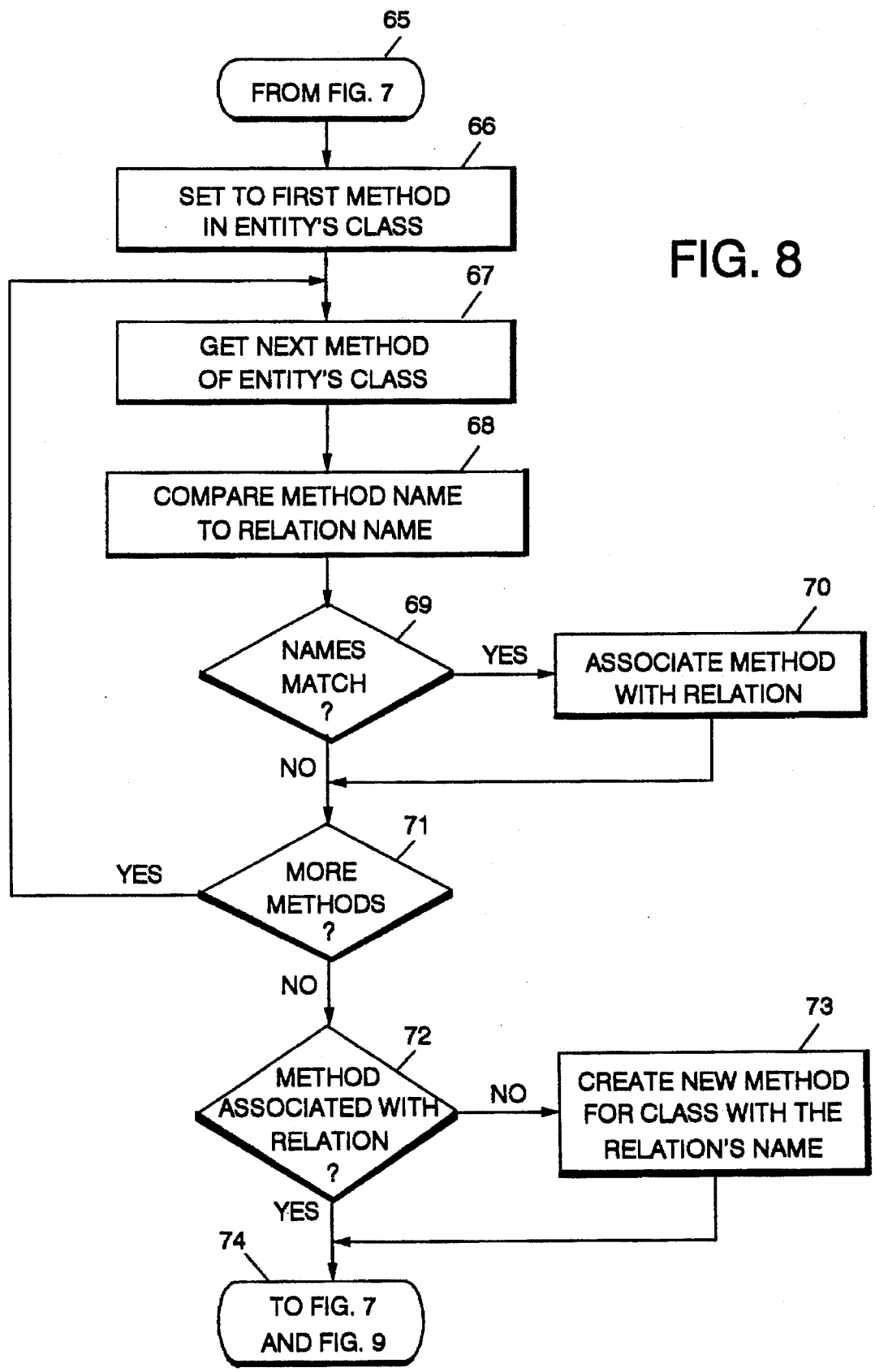

The output of block 60 is the input in block 61 which directs operation to the input of FIG. 8 block 65. In FIG. 8, in block 66, the list of entity names in the input E/R data model the information is searched and in block 67 the first entity name found from the input data is accessed and compared, in block 68, against the relationship name. If a match exists as shown in block 69 an association between the method and the relationship is made in block 70, but if the names do not match operation continues to block 71. When all methods have been exhausted, then a question is asked in block 72 as to whether the method is associated with a relationship and if the answer is no, a new method marker for the class with that relation name is created as shown in block 73. Finally the process is exited at block 74 which returns the flow back to the input on FIG. 7 into block 61.

Figure 9:
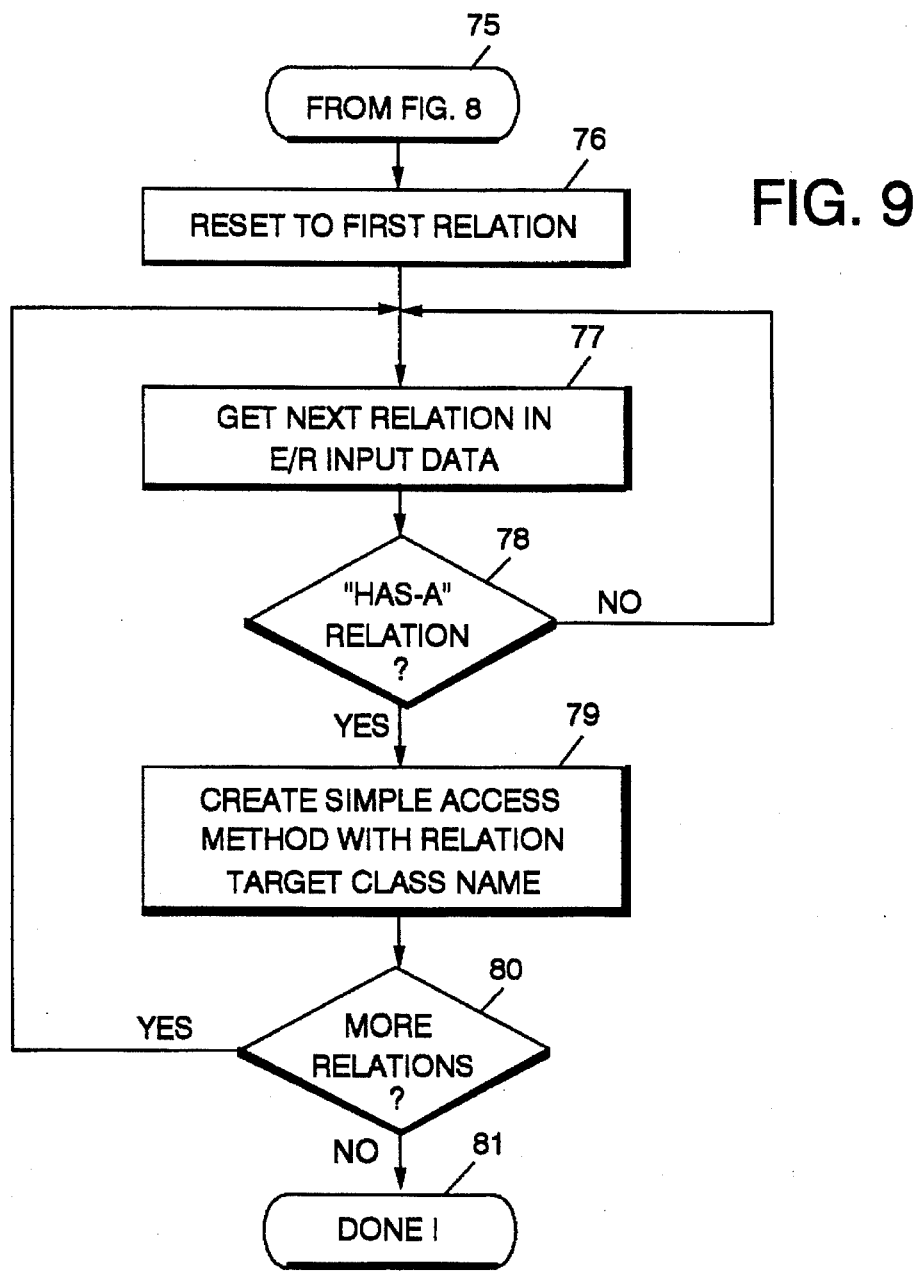

In FIG. 9 it is necessary to create access method markers. In general, this requires processing the list of relationships in the E/R data model input and evaluating for the following conditions. If the relationship found is a "has a" relationship and the target entity of the relationship is in the input list of entity names, then a generalized access method to return the value of the instance variable for the object class should be generated, but if the conditions are not met, nothing need be done.

FIG. 9 shows the process beginning in block 75. In block 76 and 77 the E/R model data input is searched and the relationships are gathered. The next relationship is examined to see if it is a "has a" relation in block 78 and if all of the relationships have been checked or if no further relations remain to be checked, the output from block 78 goes to block 79 where the next entity in the E/R data model input is accessed. If block 78 finds a "has a" relation, a simple access method with the relation target entity's name matching the object class name should be created. A check is made as to whether any further entities exist and if they do, operation loops back to the input of block 79 but if not, operation proceeds to check for any further relationships in block 80. When all relationships and entities have been exhausted the operation is complete in block 81.

The resulting data, given a simple example from FIG. 1, is shown in the Table 2 and 3 which is the transformed, object oriented terminology representative of the E/R design input data model whose conversion to O-O terms was desired.

Having thus described our invention with respect to a preferred embodiment thereof, it will be apparent to those skilled in the field that specific departures in implementation may be easily made without violating the procedural steps and logical processes defined. Wherefore, what is set forth in the following and which is desired to be protected by letters patent is by way of example and not of limitation, wherefore what is claimed is:

1. A computer process for automatically converting computer program modeling data expressed in Entity Relationship (ER) terminology and format into computer program modeling data expressed in Object Oriented (OO) terminology and format, comprising steps for:

loading ER computer program modeling data into accessible computer memory;

extracting from said ER computer program modeling data in said computer memory each unique entity name; and, responsive to said extracting, reassigning said unique entity names as OO object class names by storing said unique entity names separately as OO object class names in said memory;

determining for each said OO object class name whether the said entity having the same said unique entity name as said OO object class has a relationship between a target entity and a source entity of the "is a" type; and, responsive to said determining, arranging said OO object class names in a hierarchical inheritance grouping in which each OO object class name whose matching entity name is the source entity of an "is a" relationship is subordinate to said OO object class name which matches the target entity name of said "is a" relationship; and further, in which hierarchical inheritance grouping, each said OO object class name that has no matching entity name with a "is a" relationship is placed in an object class subject to a unique superior object class name;

extracting the names of any attributes and the parameters of any relationships accorded to said entity names in said ER modeling data;

collecting and storing in said computer memory as object class names each said attribute name; and collecting and storing as object class instance variables the names of any data elements associated to each said entity name through a "has a" relationship or by being an attribute of said entity.

2. A computer process as described in claim 1 further comprising steps for:

collecting and storing for each said object class having an entity name possessing an "other" relationship, the named functions performed by said entity as object class methods to be performed by said object class.

3. A process as described in claim 1 further comprising steps for:

collecting and storing in association with "has a" relationship bearing entities the names of all functions or methods performed in accessing related data elements associated with said entities.

4. A process as described in claim 1 further comprising steps for each said unique entity name, of:

comparing each attribute name held by these said entities in accordance with said ER modeling data with the instance variable names for the OO object class name which matches said unique entity name; and if no match is found in said comparing, adding the said attribute name to said OO object class' list of instance variable names.

5. A process as described in claim 1 further comprising:

for each unique entity name comparing the existing entity relationships of any to determine if the entity name matches a source name of an entity in an entity relationship and if so whether that relationship is a "has a" relationship and if so the object class associated with the target entity of the "has a" relationship becomes an instance variable of the object class associated with the source entity name by adding the entity name to the list of class instance variable names for the object class.

6. A method as described in claim 1, further comprising steps for:

comparing each unique entity name to the list of entities involved in any relationships for each relationship of the type "other" comparing the list of methods for the object class associated with the source entity of said entity relationship for a match between the method name and the relationship name and if a match is found creating an association pointer between the existing said method and the existing said relationship but if no match is found adding a method with the name of the relationship to the object class' list of associated methods.

7. A process as described in claim 2, further comprising steps for:

collecting and storing in association with "has a" relationship bearing entities, the names of all functions or methods performed in accessing related data elements associated with said entities.

8. A process as described in claim 2, further comprising steps for:

comparing, for each unique entity name, each attribute name with any instant variable names for the entities associated said OO object class name, and if a match is found, do nothing, but if no match is found, adding the attribute name to the associated object's class list of instant variable names as an instance variable for said object class to be associated with said entity.

9. A process as described in claim 3, for each said unique entity name, further comprising steps for:

comparing each attribute name held by these said entities in accordance with said ER modeling data with the instance variable names for the OO object class name which matches said unique entity name; and if no match is found in said comparing, adding the said attribute name to said OO object class' list of instance variable names.

10. A process as described in claim 2, further comprising:

for each unique entity name, comparing the existing entity relationships, if any, to determine if the entity name matches a source name of an entity in an entity relationship and, if so, whether that relationship is a "has a" relationship and, if so, the OO object class associated with the target entity of the "has a" relationship becomes an instant variable of the OO object class associated with the source entity name by adding the entity name to the list of class instance variable names for the OO object class.

11. A process as described in claim 3, further comprising:

for each unique entity name, comparing the existing entity relationships, if any, to determine if the entity name matches a source name of an entity in an entity relationship and, if so, whether that relationship is a "has a" relationship and, if so, the OO object class associated with the target entity of the "has a" relationship becomes an instant variable of the OO object class associated with the source entity name by adding the entity name to the list of class instance variable names for the OO object class.

12. A process as described in claim 4, further comprising:

for each unique entity name, comparing the existing entity relationships, if any, to determine if the entity name matches a source name of an entity in an entity relationship and, if so, whether that relationship is a "has a" relationship and, if so, the OO object class associated with the target entity of the "has a" relationship becomes an instant variable of the OO object class associated with the source entity name by adding the entity name to the list of class instance variable names for the OO object class.

13. A method as described in claim 2, further comprising steps for:

comparing each unique entity name to the list of entities involved in any relationships, and for each relationship of the type "other", comparing the list of methods for the OO object class associated with the source entity of said entity relationship for a match between the method name and the relationship name, and if a match is found, creating an association pointer between the existing said method and the existing said relationship, but if no match is found, adding a method with the name of the relationship to the OO object class' list of associated methods.

14. A method as described in claim 3, further comprising steps for:

comparing each unique entity name to the list of entities involved in any relationships, and for each relationship of the type "other", comparing the list of methods for the OO object class associated with the source entity of said entity relationship for a match between the method name and the relationship name, and if a match is found, creating an association pointer between the existing said method and the existing said relationship, but if no match is found, adding a method with the name of the relationship to the OO object class' list of associated methods.

15. A method as described in claim 4, further comprising steps for:

comparing each unique entity name to the list of entities involved in any relationships, and for each relationship of the type "other", comparing the list of methods for the OO object class associated with the source entity of said entity relationship for a match between the method name and the relationship name, and if a match is found, creating an association pointer between the existing said method and the existing said relationship, but if no match is found, adding a method with the name of the relationship to the OO object class' list of associated methods.

16. A method as described in claim 5, further comprising steps for:

comparing each unique entity name to the list of entities involved in any relationships, and for each relationship of the type "other", comparing the list of methods for the OO object class associated with the source entity of said entity relationship for a match between the method name and the relationship name, and if a match is found, creating an association pointer between the existing said method and the existing said relationship, but if no match is found, adding a method with the name of the relationship to the OO object class' list of associated methods.

* * * * *